Dec. 27, 1966   D. J. HARDY   3,294,188
SHOCK ABSORBING MEANS FOR AIR CUSHION VEHICLES
Filed Dec. 4, 1964   3 Sheets-Sheet 1

Dec. 27, 1966  D. J. HARDY  3,294,188
SHOCK ABSORBING MEANS FOR AIR CUSHION VEHICLES
Filed Dec. 4, 1964  3 Sheets-Sheet 2

United States Patent Office

3,294,188
Patented Dec. 27, 1966

3,294,188
SHOCK ABSORBING MEANS FOR AIR
CUSHION VEHICLES
Derek J. Hardy, Cowes, Isle of Wight, England, assignor to Westland Aircraft Limited, Somerset, England
Filed Dec. 4, 1964, Ser. No. 415,883
Claims priority, application Great Britain, Jan. 16, 1964, 1,903/64
3 Claims. (Cl. 180—7)

This invention relates to air cushion vehicles and more particularly to means provided to protect the underside of such vehicles when they come to rest on a surface.

In operation of vehicles of this kind it will be apparent that should an obstruction appear in the path of the vehicle or should another craft or vehicle be approaching on a collision course it may be necessary for the driver of an air cushion vehicle to execute an emergency stop by forcing the vehicle down on to the surface over which it is operating. Again, should the air cushion collapse unexpectedly the vehicle will rapidly settle upon the surface over which it is operating. In either case the driver of an air cushion vehicle is forced to execute an emergency landing while the vehicle still has forward speed.

Existing air cushion vehicles are provided with support means, which are designed to support the vehicle while it is at rest at a chosen base and are not designed to protect the understructure of the vehicle from damage should it alight upon a rocky or uneven surface, or have a horizontal component motion, when coming into contact with a surface.

It is an object of this invention to provide an air cushion vehicle which can stop, in an emergency, by being forced down without sustaining damage from the surface over which it is operating.

It is a further object of the invention, to provide an air cushion vehicle, which, in the event of a sudden collapse of the air cushion, will be able to execute a forced landing with horizontal movement without damage.

A still further object of the invention is to provide an air cushion vehicle which can operate away from its chosen bases and alight upon a rocky or uneven surface without sustaining damage.

Accordingly I provide, a device for reducing impact forces to the underside of an air cushion vehicle, when such a vehicle is moving in a forward direction and contacting a land or water surface, the device consisting of shock absorbing members attached to the underside of the vehicle.

At least one impact reducing device is attached to the rigid structure of the air cushion vehicle within each of the compartments formed by the partitioning of the overall cushion area and the combination of a plurality of such members provides a stable support for the air cushion vehicle when it is at rest. Each member is shaped to enable it to ride over obstacles when the vehicle alights with forward motion.

The members may be solid in which case they are attached to the rigid structure of the air cushion vehicle by way of suitable shock absorbing means. Or, the members may be in the form of suitably reinforced inflated flexible tubes in which case the tubes can be arranged so that their pneumatic properties provide the required shock absorbing characteristics. Whatever form of shock absorbing member is used it is arranged so that, even when deflected under load it protrudes below the rigid part of the vehicle the minimum amount necessary to provide protection for the rigid understructure from stones, uneven ground and like hazards.

It has been emphasized that the members should protrude sufficiently below the rigid portion of the air cushion vehicle or be of sufficient size to ensure that the rigid understructure of the vehicle does not suffer damage. This may mean that the obstacle clearance characteristics of the vehicle, enhanced by the provision of a flexible skirting assembly are reduced. Accordingly some or all of the members may be arranged to be retractable and extensible or the inflated members may be arranged to be deflatable and inflatable so that the vehicle retains its maximum obstacle clearance characteristics.

Various ways of carrying the invention into effect will now be described and illustrated by way of example with reference to the accompanying drawings in which.

Figure 1:
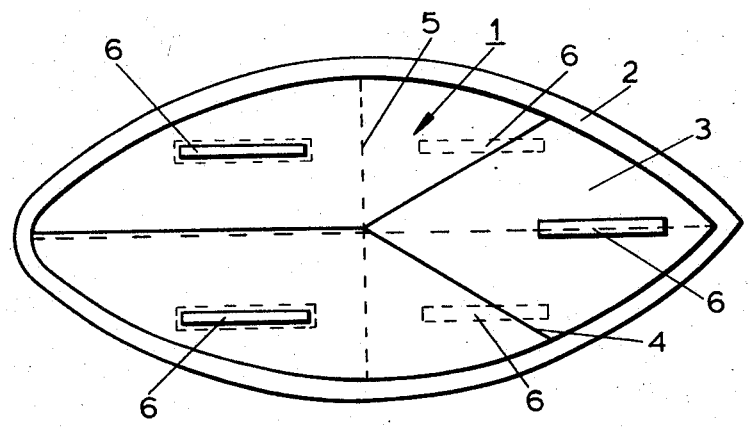
FIGURE 1 is an inverted plan of an air cushion vehicle showing alternative compartmentation arrangements and alternative arrangements of the shock absorbing members to suit the compartmentation.

The general form of the cushion area of an air cushion vehicle is shown in FIGURE 1 where the rigid body 1 has depending therefrom a peripheral skirting assembly 2 forming the boundary of the air cushion 3. Continuous lines 4 and dotted lines 5 represent alternative compartmentation barriers dividing the cushion area respectively into either three or four compartments, one shock absorbing member 6 being provided in each compartment. In this figure the shock absorbing members 6 are shown in either continuous or dotted lines so that they are in agreement with the continuous and dotted lines 4 and 5 which represent the compartment barriers.

Figure 2:
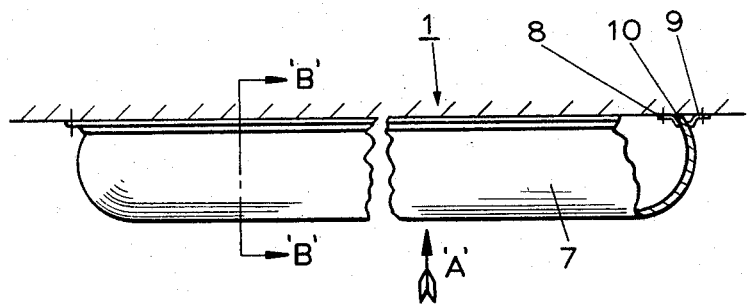
FIGURE 2 is an elevation of an inflatable shock absorbing member with one end sectioned to show the attachment arrangements.
Figure 3:
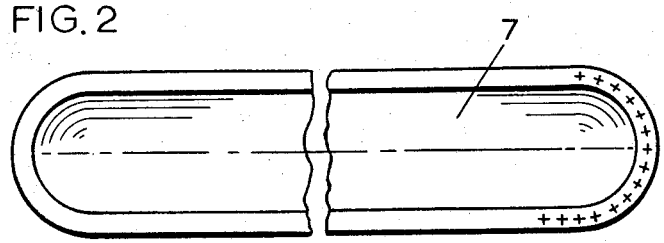
FIGURE 3 is another view of the member shown in FIGURE 2 viewed in the direction of the arrow A.
Figure 4:
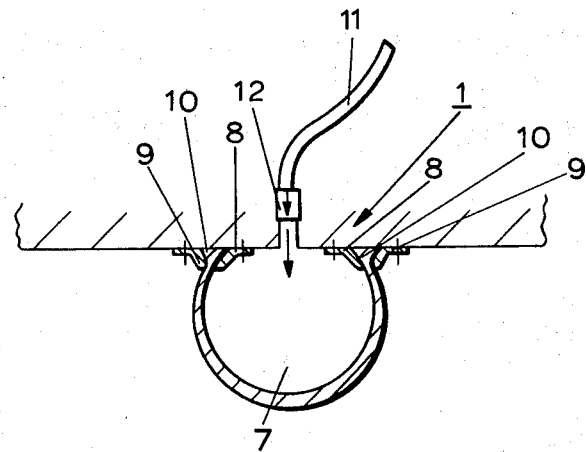
FIGURE 4 is a section of FIGURE 2 at the station B—B on a different scale.

An inflatable form of shock absorbing member is illustrated in FIGURES 2, 3 and 4. A reinforced rubber skid 7 is attached to the rigid part 1 of the air cushion vehicle by inner securing rims 8 and outer securing rims 9. The rims may be made up of more than one section for ease of assembly and are removably attached to the rigid part of the vehicle by, for example, bolts and anchor nuts. The securing rims 8 and 9 co-operate with the beaded edges 10 of the skid 7 to form an air tight joint so that the skid can be inflated. Alternately a separate inner pressure tube may be used. High pressure inflation air is fed from a supply (not shown) which may be an engine driven compressor on the vehicle or a source separate from the vehicle via a pipe 11 and valve 12 to each inflatable skid. The valve 12 may be of the non return type or it may be of a type which will allow the skid 7 to be deflated as well as inflated. The curved ends of the skid 7 provide a lead which assists the skid to ride over rough ground when the vehicle alights with forward movement and the ground contact area of the skid 7 may be reinforced to give improved wearing qualities.

Figure 5:
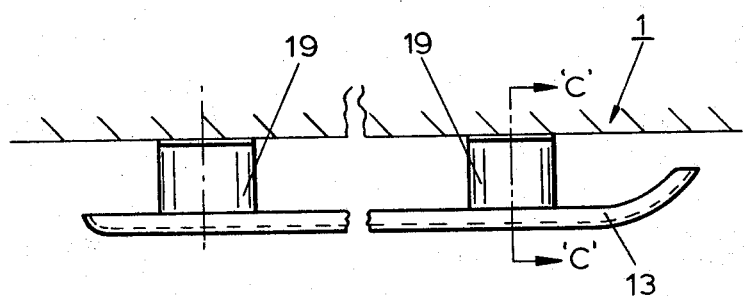
FIGURE 5 is a pictorial elevation of a solid shock absorbing member.
Figure 6:
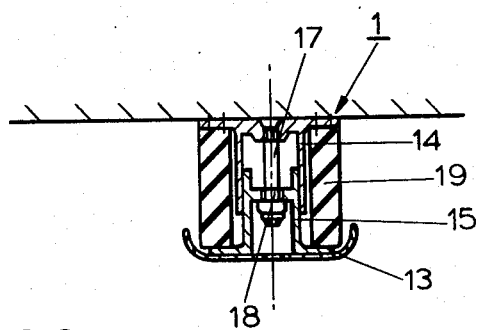
FIGURE 6 is a section of FIGURE 5 at the station C—C on a different scale showing the shock absorbing attachment means.
Figure 7:
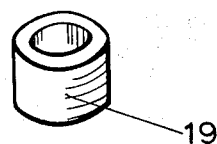
FIGURE 7 is a pictorial view of a rubber shock absorbing bush.

Another form of the invention is illustrated in FIGURES 5, 6 and 7 which describes a rigid ski 13, with an upturned leading end attached to the rigid part 1 of an air cushion vehicle by a plurality of shock absorbing means. Each shock absorbing means consists of an outer cylindrical tube 14 attached to the rigid part 1 of the vehicle and an inner cylindrical tube 15 which is attached to the ski 13. The inner tube 15 is arranged to slide inside the bore of the outer tube 14 but its amount of travel is restricted by the bolt 17 and nut 18 so that the tubes 14 and 15 are always in engagement with each other. A rubber compression bush 19 is positioned between flanges on the tubes 14 and 15 and absorbs the alighting loads.

Figure 8:
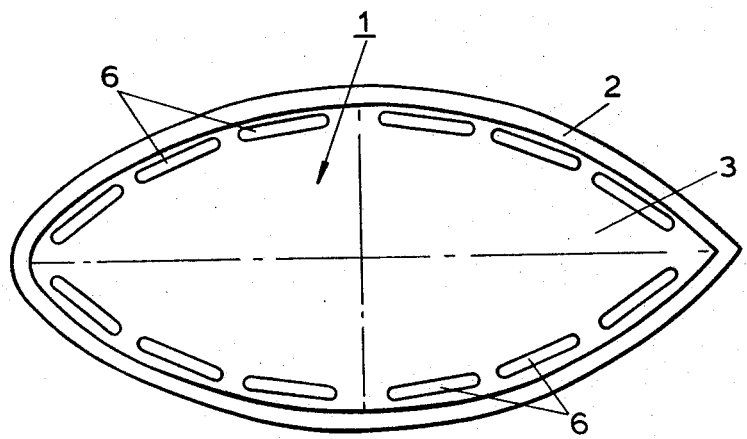
FIGURE 8 is an inverted plan of an air cushion vehicle showing another arrangement of the shock absorbing members.

An alternative arrangement of shock absorbing members is shown in FIGURE 8 where a plurality of members 6, which may be either inflatable or solid, are arranged to follow the planform of the vehicle.

In other arrangements (not shown) one inflatable shock absorbing member is arranged to follow the planform of the vehicle or to be circular, the diameter of the circle being the largest which can be accommodated within the flexible skirting assembly.

I claim as my invention:

1. An air cushion vehicle comprising a rigid body structure, a peripheral skirting assembly secured to the periphery of the rigid body structure and depending therefrom to form the boundary of the air cushion, and shock absorbing means secured directly to the rigid body structure and depending therefrom, the lower edge of the shock absorbing means extending below the rigid body structure a minimum distance sufficient to protect the underside of the rigid body structure from obstacles, said shock absorbing means comprising reinforced rubber skids secured directly to the rigid body structure, said reinforced rubber skids having curved ends to provide leads to assist the skid in movement over rough ground.

2. An air cushion vehicle according to claim 1 wherein the reinforced skids are formed as inflatable tubes and means in said rigid body structure for inflating said tubes.

3. An air cushion vehicle according to claim 2 wherein said inflatable tubes are secured to the underside of the rigid body structure by means of inner and outer securing rims.

References Cited by the Examiner

UNITED STATES PATENTS

| | | | |
|---|---|---|---|
| 1,151,474 | 5/1914 | Kepler | 280—150 X |
| 3,080,584 | 3/1963 | Brown | 280—12 |
| 3,172,494 | 3/1965 | Cockerell | 180—7 |
| 3,177,959 | 4/1965 | Gaska | 180—7 |
| 3,221,831 | 12/1965 | Weiland | 180—7 |

MILTON BUCHLER, *Primary Examiner.*

BENJAMIN HERSH, *Examiner.*

M. S. SALES, *Assistant Examiner.*